No. 868,329. PATENTED OCT. 15, 1907.
H. S. CORBITT.
BICYCLE PROPELLING MECHANISM.
APPLICATION FILED MAR. 27, 1907.

2 SHEETS—SHEET 2.

WITNESSES:

Hebber S. Corbitt,
INVENTOR.

By C. A. Snow & Co.
ATTORNEYS

UNITED STATES PATENT OFFICE.

HEBBER S. CORBITT, OF AYDEN, NORTH CAROLINA.

BICYCLE PROPELLING MECHANISM.

No. 868,329.  Specification of Letters Patent.  Patented Oct. 15, 1907.

Application filed March 27, 1907. Serial No. 364,894.

*To all whom it may concern:*

Be it known that I, HEBBER S. CORBITT, a citizen of the United States, residing at Ayden, in the county of Pitt and State of North Carolina, have invented a new and useful Bicycle Propelling Mechanism, of which the following is a specification.

This invention relates to apparatus employed for the propulsion of bicycles and other wheeled vehicles.

The principal object of the invention is to provide an improved propelling mechanism of simple and economical construction in which the change in pressure exerted on the saddle as the rider is operating the machine may be utilized as a propelling force.

With this and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 1:
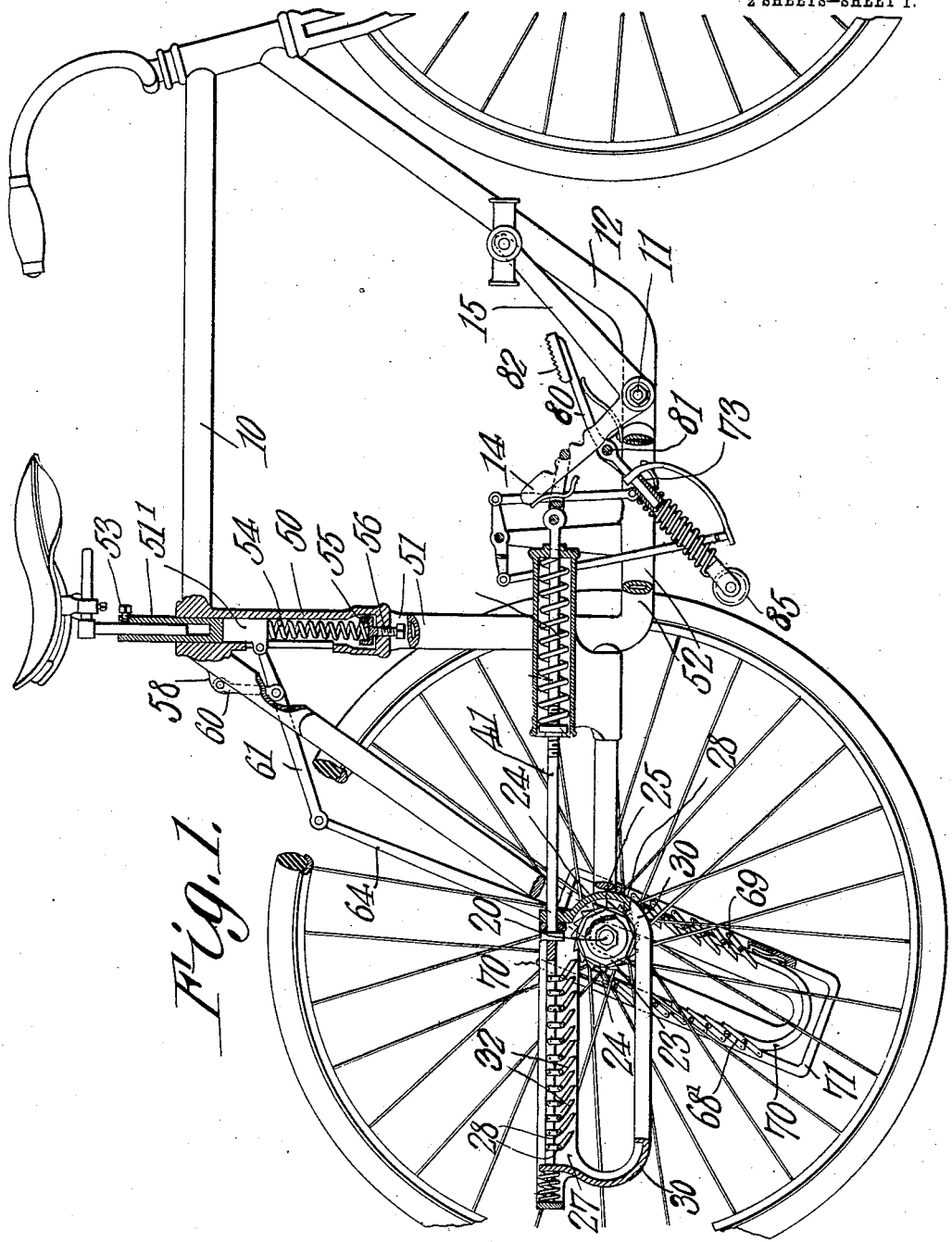
Figure 2:
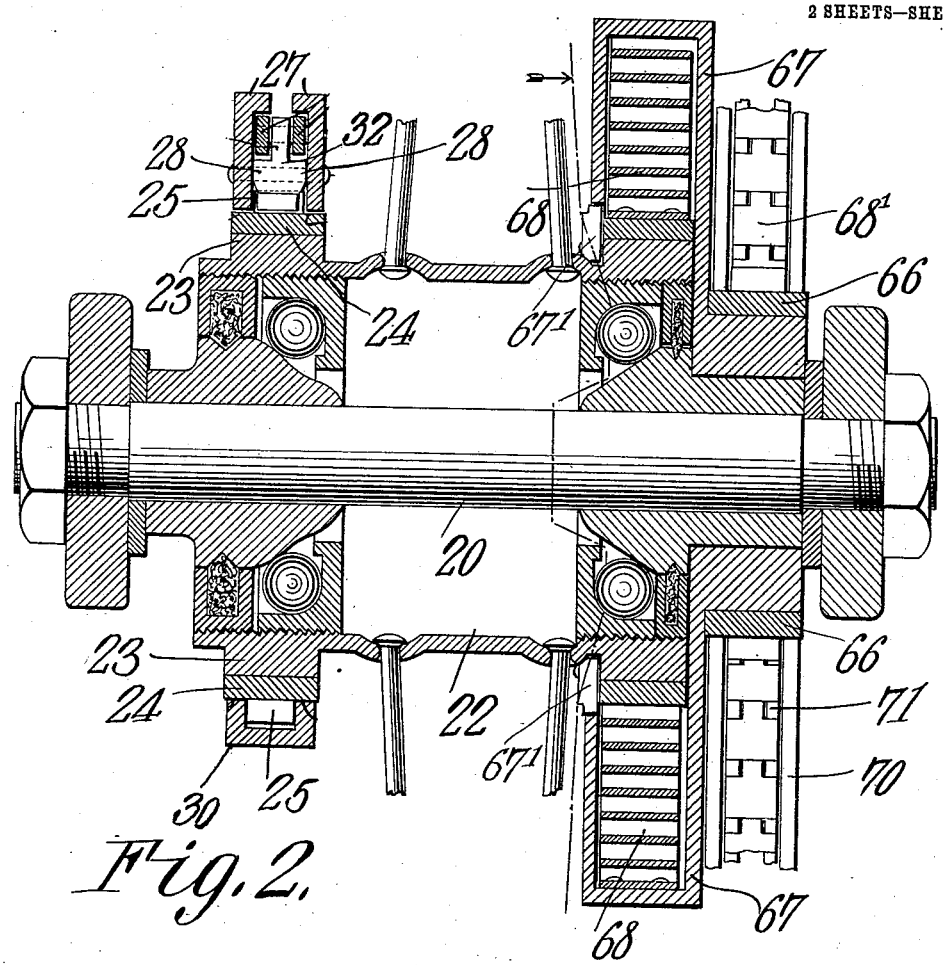
Figure 3:
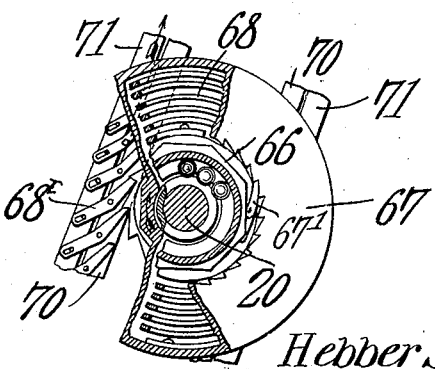

In the accompanying drawings:—Figure 1 is a side elevation, partly in section, of bicycle propelling mechanism constructed and arranged in accordance with the invention. Fig. 2 is a transverse sectional view on an enlarged scale through the rear wheel hub. Fig. 3 is a sectional view through a portion of the hub illustrating a portion of the mechanism in detail.

Similar numerals of reference are employed to indicate corresponding parts throughout the several figures of the drawings.

The frame 10 of the bicycle is preferably of the ordinary construction, with the exception of the seat post, which is slightly modified, as will hereinafter appear.

The crank shaft 11 is mounted in a hanger 12 and carries bell crank levers 14—15, the arm 15 being provided with a suitable pedal, and the arm 14 being connected through a rod 41 to the propelling mechanism of the rear wheel.

The rear axle 20 carries a hub 22 having the usual spoke members for connection with the felly of the rear or driving wheel. Secured to the hub is a polygonal collar 23 having a ratchet wheel 24 that is provided with ratchet teeth 25. The ratchet teeth 25 which project from the collar are of considerably less width than the collar proper, thus affording a pair of annular shoulders on which may rest a pair of rack bars 27. These rack bars are maintained in spaced relation by sleeves 28. These ratchet teeth are engaged by driving pawls 32 that are carried by rack bars 27, the rack bars riding on shoulders formed at the opposite sides of the ratchet teeth, and the rack bars being connected by straps 30, the whole forming a reciprocatory frame which is connected to the rod 41 and receives movement through said rod 41 from the pedals.

The seat post 50 of the frame is hollow and extends in a vertical line from the upper portion of the frame down to a point near the crank pin, its lower end being bifurcated to form a pair of small tubes 51 which carry the hanger.

In the top portion of the seat post is arranged a saddle post 51' that preferably is rectangular in cross section, and the hollow seat post is preferably of the same contour in order to prevent turning. The saddle post rests on a compression spring 54 that extends between the bottom end of the post and the lower end of the tube 50, and in the lower portion of the tube is a cup 55 which rests on an adjustable screw 56 which may be turned to alter the stress of the spring in accordance with the weight of the rider.

Pivoted to a bracket 58 projecting from the upper portion of the frame is a link 60, the lower end of which is connected to a lever 61 at a point intermediate the ends of the latter, and the forward end of the lever is pivotally connected to the lower portion of the saddle post 51'. The rear end of the lever is connected by a rod 64 to a mechanism which serves to impart movement from the saddle post to the rear driving wheel, so that the weight of the rider and the vertical reciprocation of the saddle due to riding over rough roads may be utilized as a propelling force.

Mounted loosely on the rear wheel hub and free to rotate thereon is a cylindrical casing, comprising a collar 66 and a spring barrel 67, and in the spring barrel is a spiral spring 68, one end of which is firmly secured to the hub, and the other end to the barrel. The spring barrel 67 is provided with ratchet teeth with which engage one or more locking pawls 67' that prevent rotative movement of the collar or spring barrel in a direction which would tend to unwind the spring, leaving the collar and barrel free to rotate in the opposite or spring winding direction.

The collar 66 is provided with ratchet teeth which are engaged by two sets of pawls 68' and 69, one set facing in one direction and the other in the opposite direction. The two sets of pawls are pivoted in a U-shaped frame 70 which encircles the collar, and the outer ends or tail portions of the pawls are pivotally connected to a loop shaped frame 71 which is connected at one end to the rod 64, there being sufficient space at the upper end of the two loop frame to permit free rotation of the toothed collar when the pedals are in the highest position.

It will be observed that as the saddle rises and falls during the travel of the machine over rough or uneven surfaces, movement in both directions will be transmitted to the rear wheel hub mechanism to assist in winding up the spring, and the unwinding force of the spring will be transmitted as propelling power. Again, when the rider depresses the pedals he necessarily removes a portion of his weight from the saddle, and this difference in weight causes the spring 54 to expand and its force is thus utilized in propelling the machine.

The machine is provided with a brake comprising a bar 80 pivoted on a pin 81. At one end is a pedal 82 and at the opposite end a roller 85 for engagement with the periphery of the rear wheel.

I claim:—

1. In bicycle propelling mechanism, a driving hub, a spring barrel mounted loosely thereon, a spiral spring having one end secured to the barrel and the other end secured to the hub, a pawl and ratchet connection between the barrel and hub, a ratchet wheel carried by the barrel, a pair of loop shaped frames encircling the ratchet wheel, a plurality of ratchet wheel engaging pawls carried by one of the frames, loose pivotal connections between the tails of the pawls and the other frame, a vertically movable seat post, and means for operatively connecting the seat post to the pawl tail carrying frame.

2. In bicycle propelling mechanism, a driving hub, a spring barrel mounted thereon, a spiral spring arranged in the barrel and having one end connected thereto, and the opposite end to the hub, a pawl and ratchet connection between the barrel and hub, a ratchet wheel carried by the barrel, a pair of U-shaped frames encircling the ratchet wheel, a pair of sets of pawls facing in opposite directions, respectively, both sets of pawls being arranged to engage the ratchet wheel, pivotal connections between the pawls and one of the frames, loose pivotal connections between the tails of the pawls and the second frame, a vertically movable saddle post, an adjustable spring supporting the same, a pivotally mounted frame supported link, a lever carrying the link, one end of the lever being pivotally connected to the saddle post, and a link connecting the opposite end of said lever to said second frame.

In testimony that I claim the foregoing as my own, I have hereto affixed my signature in the presence of two witnesses.

HEBBER S. CORBITT.

Witnesses:
ANDREW J. MOORE,
J. H. MANNING.